PARALLEL BINARY COMPARATOR CIRCUIT
Filed Oct. 21, 1957
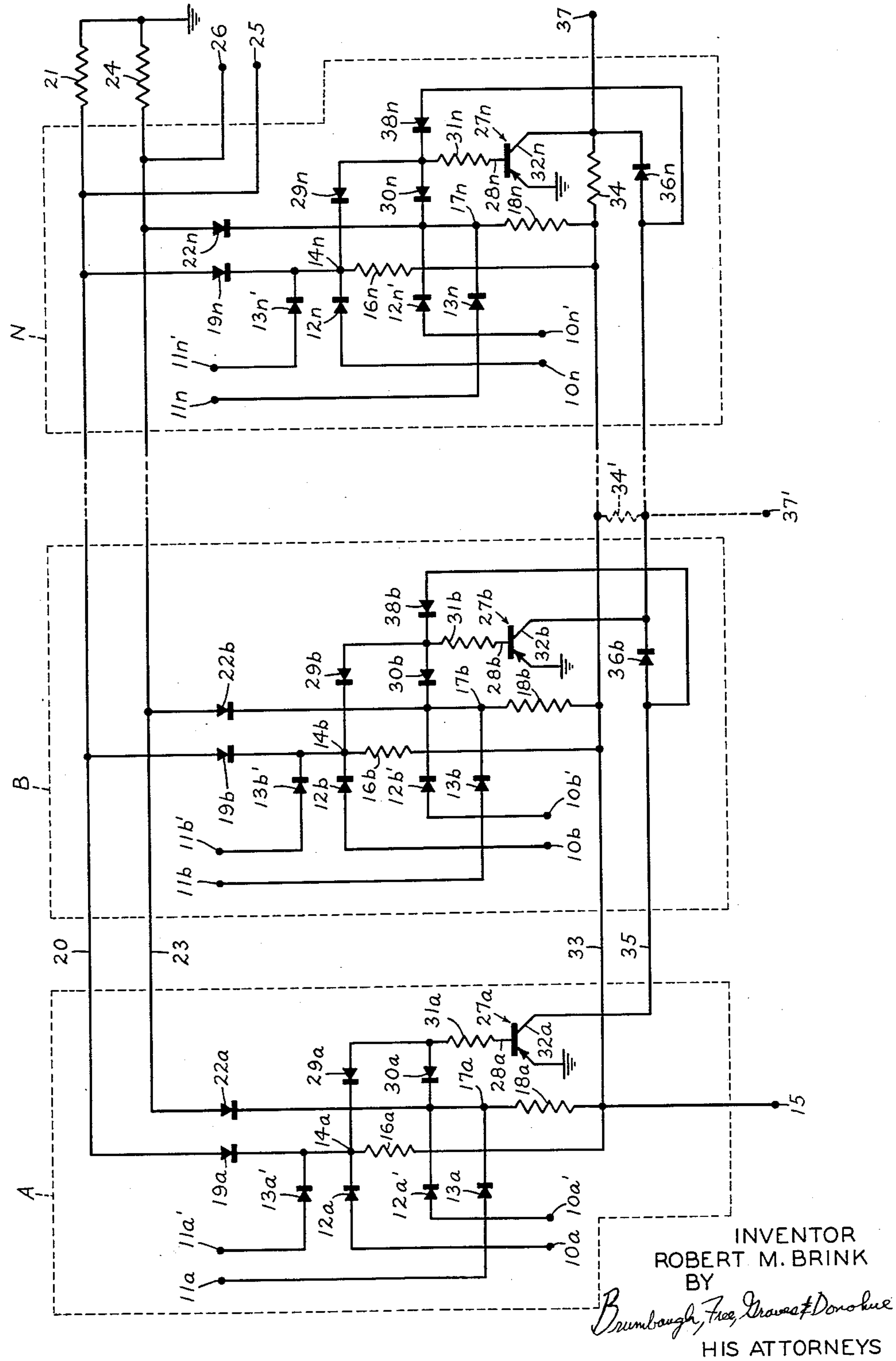
INVENTOR
ROBERT M. BRINK
BY
Brumbaugh, Free, Graves & Donohue
HIS ATTORNEYS 3,000,001
Patented Sept. 12, 1961

3,000,001

PARALLEL BINARY COMPARATOR CIRCUIT

Robert M. Brink, New Canaan, Conn., assignor to Time, Incorporated, New York, N.Y., a corporation of New York Filed Oct. 21, 1957, Ser. No. 691,470
10 Claims. (Cl. 340—149)

This invention relates to comparators and, more particularly, to a comparator adapted to determine the relationship between two numbers composed of binary digits and the direction of any inequality of the numbers.

In information processing systems and the like utilizing numbers comprised of binary digits, it is often necessary to compare two such numbers at certain stages of the process and to direct succeeding operations in accordance with the condition of equality or the direction of inequality of the numbers. In addition, it is sometimes desired to compare corresponding groups of higher order digits comprising less than all the digits in the numbers. Conventional circuits for making such comparisons, however, include a relatively large number of components and tend to be complex in design and operation.

Accordingly, it is an object of this invention to provide a new and improved comparator for binary numbers of simple design and including a minimum number of components.

Another object of the invention is to provide a comparator of the above character arranged to indicate the direction of inequality of two different numbers.

A further object of the invention is to provide a comparator capable of determining inequalities of corresponding groups of higher order digits less than the total number.

These and other objects of the invention are attained by applying binary signals representing a digit of one of the numbers to be compared and the complement of the corresponding digit in the second number to one AND gate while two other signals representing the digit of the second number and the complement of the digit in the first are applied to another AND gate. Each gate is arranged to be actuated by application of two similar signals of one of the binary types but not by identical signals of the other binary type. Coincidence of like signals of the proper type at either gate, caused by inequality of the digits, initiates an inequality signal indicating the direction of the inequality according to which gate is actuated. Similar circuits are arranged to indicate inequalities of the subsequent corresponding digits in the two numbers being compared and a blocking signal from a transistor in each circuit, actuated by the operation of either of the AND gates renders the comparing circuits for subsequent digits inoperative.

Further objects and advantages of the invention will be apparent from a reading of the following description in conjunction with the single accompanying drawing which illustrates schematically a typical circuit for carrying out the invention.

In comparing two binary numbers according to the invention wherein each digit of each number may be, for example, either a "zero" or a "one," a negative voltage signal is utilized to represent a "one" while zero voltage corresponds to a digit having a value of "zero." In addition, the complement of each digit is represented by the opposite voltage condition, the "zero" complement being a negative signal and the "one" complement a zero voltage signal. It will be readily apparent that like digits in this system are represented by identical digit and complement signals, and that for unlike digits the greater digit and the complement of the lesser digit will be represented by negative signals and the lesser digit and the complement of the greater digit by zero voltage signals.

Referring to the schematic diagram, circuits are provided for comparing each corresponding pair of digits in the two numbers, the highest order pair being compared by the circuit enclosed in the block A, the second highest by the circuit in the block B, and the lowest by the block N circuit. Intermediate pairs of digits are compared by other circuits (not shown) identical to that in the block B interposed in the system as indicated by the dotted portions of the connecting conductors 20, 23, 33 and 35.

In carrying out a comparison according to the invention, the digit signal and its complement for the highest order digit of a first binary number are applied to two terminals 10*a* and 10*a'* respectively in the circuit A, while the digit signal and its complement for the highest order digit of a second binary number to be compared therewith are applied at two terminals 11*a* and 11*a'* respectively. In order to detect coincidence of a digit signal and a like complement signal, the terminals 10*a* and 11*a'* are joined to the anodes of two diodes 12*a* and 13*a'* respectively, which form the input of a first AND gate, their common cathode junction 14*a* being connected to a negative voltage terminal 15 through a resistor 16*a*. In a similar manner, the terminals 11*a* and 10*a'* supply the input for a second AND gate comprising two diodes 13*a* and 12*a'* which likewise have their common cathode junction 17*a* linked to the negative terminal 15 through another resistor 18*a*.

It will be noted that the common cathodes of the diodes 12*a* and 13*a'* are also connected to ground through the cathode of another diode 19*a*, a conductor 20, and a resistor 21, the other pair of diodes 13*a* and 12*a'* being similarly grounded through a diode 22*a*, a conductor 23, and a resistor 24. In this manner, each of the common cathode junctions 14*a* and 17*a* is normally maintained at a substantially fixed potential until negative signals are applied to both input terminals of the corresponding AND gate, driving the junction to a negative potential. This may be detected at one of the output terminals 25 and 26 which are connected to the conductors 20 and 23 respectively. Coincidence of negative signals at either AND gate in this manner also actuates a grounded emitter transistor 27*a*, having its base electrode 28*a* connected to both junctions 14*a* and 17*a* through two diodes 29*a* and 30*a* respectively and a common resistor 31*a* because of the negative voltage applied to its base electrode 28*a*. As a consequence, the collector electrode 32*a* of the transistor 27*a* which is connected to a negative conductor 33 through a resistor 34, a common collector line 35, and diodes 36*b* through 36*n*, inclusive, approaches ground potential along with the line 35 and the diodes 36*b* through 36*n* inclusive. In order to detect this condition, an output terminal 37 is connected to the positive side of the resistor 34 and is maintained at a negative potential by the line 33 in the absence of an inequality as indicated by the conduction of any transistor.

In the comparing circuits B and N and the intermediate ones not shown, the ground potential of the line 35 caused by the transistor actuation is applied through diodes 38*b* through 38*n*, preventing the base electrodes of the corresponding transistors 27*b* through 27*n* from going negative and also maintaining the junctions 14*b* and 17*b* through 14*n* and 17*n* near ground potential to disable the corresponding AND gates in these circuits. This action prevents differences between subsequent corresponding digits from affecting the indication of the direction of inequality of the two numbers. In all other respects the circuits B and N and the intermediate comparing circuits are identical with the A circuit and similar elements included therein are identified by the same numerals followed by an alphabetical character corresponding to the circuit.

As mentioned above, like digits at corresponding positions in the two numbers being compared are represented by similar digit signals and similar complement signals and, inasmuch as each AND gate input is supplied by the digit signal of one digit and the complement signal of the other, neither gate will be actuated when two like digits are compared. When this condition exists for all corresponding digits of the two numbers, the conductors 20 and 23 and their associated terminals 25 and 26 will approach ground potential and the collector line 35 and its terminal 37 will be held at a negative voltage. If, however, the highest order digit of the first number is "one," as represented by a negative signal at the terminal 10*a* and the corresponding digit in the second number is "zero" causing negative voltage to be applied to the terminal 11*a'*, the common cathode junction 14*a* will become negative, pulling the conductor 20 and the terminal 25 negative with it. On the other hand, if the digit of the second number is greater the terminal 26 will become negative in the same manner. In both these cases the output terminal 37 approaches ground potential when the transistor 27*a* conducts to disable subsequent comparison circuits as described above.

If the comparison made by the circuit A indicates that the highest order digits are equal, the comparison proceeds to the next higher order digits as represented by signals applied to the circuit B, and from there to the lowest order in sequence and, if all the corresponding digits are identical, a negative voltage appears at the terminal 37 at the end of the comparison. Inequalities of any lower order digits are indicated at the terminals 25 and 26 in the same manner as with the highest digits, thus producing a negative signal at the terminal 25 if the first number is greater than the second and a negative signal at the terminal 26 if the second is greater than the first.

If it is desired to compare similar groups of higher order digits less than the total number, a resistor 34' may be inserted between the lines 33 and 35 after the circuit for comparing the last digits of the groups. This is illustrated in the accompanying drawing for the first two digits of each number, an output terminal 37' being joined to the conductor 35 after the circuit B. A negative signal appearing at this terminal therefore indicates equality of the first two digits of each number.

Although the invention has been described herein with reference to a specific embodiment, many modifications and variations therein will occur to those skilled in the art. Accordingly, the invention is not intended to be restricted in scope except as defined by the following claims.

I claim:

1. Apparatus for comparing two binary numbers in parallel representation digit by digit comprising a comparing circuit for each pair of corresponding digits to be compared including at least one AND gate responsive to entry of signals representing unequal digits to provide an output indicating the inequality, and transistor means responsive to the operation of the gate adapted to disable the circuits for comparing subsequent corresponding digits.

2. Apparatus for comparing two binary numbers in parallel representation digit by digit comprising a comparing circuit for each pair of corresponding digits to be compared including a pair of AND gates responsive to entry of signals representing unequal digits to provide an output indicating the inequality and being rendered operative selectively according to the direction of inequalities of the digits, and transistor means responsive to the operation of either gate adapted to disable the circuits for comparing subsequent corresponding digits.

3. Apparatus according to claim 2 including signal output means responsive to the operation of each AND gate to indicate the direction of any inequality detected.

4. Apparatus according to claim 2 including signal output means responsive to the operation of the transistor means in each circuit adapted to indicate equality of the numbers.

5. Apparatus for comparing two binary numbers in parallel representation digit by digit wherein each digit is represented in bipolar form comprising a comparing circuit for each pair of corresponding digits to be compared including a first AND gate responsive to entry of signals representing a digit of the first number and the complement of the corresponding digit of the second number and a second AND gate responsive to entry of signals representing a digit of the second number and the complement of the corresponding digit of the first number to provide an output indicating inequality of the digits, and transistor means in each circuit responsive to the operation of each AND gate adapted to disable the circuits for comparing subsequent corresponding digits.

6. Apparatus according to claim 5 including output means responsive to the operation of each AND gate to indicate the direction of any inequality in the digits.

7. Apparatus according to claim 5 wherein each AND gate comprises a pair of diodes having their anodes adapted to receive digit and digit complement signals respectively and their common cathodes linked to the output means and to the transistor means.

8. Apparatus according to claim 7 wherein the transistor means is rendered conductive by the operation of either AND gate.

9. Apparatus for comparing two numbers each composed of a plurality of parallel binary digits comprising a plurality of comparison circuits, each having two AND gates responsive to entry of signals representing unequal digits to provide an output signal indicating the inequality, signal output means responsive to the operation of corresponding AND gates in each of the circuits adapted to indicate the direction of any inequality, transistor means in each circuit responsive to the operation of either of the AND gates in the circuit adapted to disable the circuits for comparing subsequent pairs of digits, and signal output means responsive to the operation of the transistor means in each circuit adapted to indicate inequality of the numbers.

10. Apparatus according to claim 9 including second signal output means responsive to the operation of the transistor means in a group including less than all of the comparator circuits adapted to indicate equality of all the digit pairs within the group.

References Cited in the file of this patent

UNITED STATES PATENTS

| | | |
|---|---|---|
| 2,749,440 | Cartwright | June 5, 1956 |
| 2,831,987 | Jones | Apr. 22, 1958 |
| 2,837,732 | Nelson | June 3, 1958 |
| 2,889,534 | Lubkin | June 2, 1959 |